UNITED STATES PATENT OFFICE.

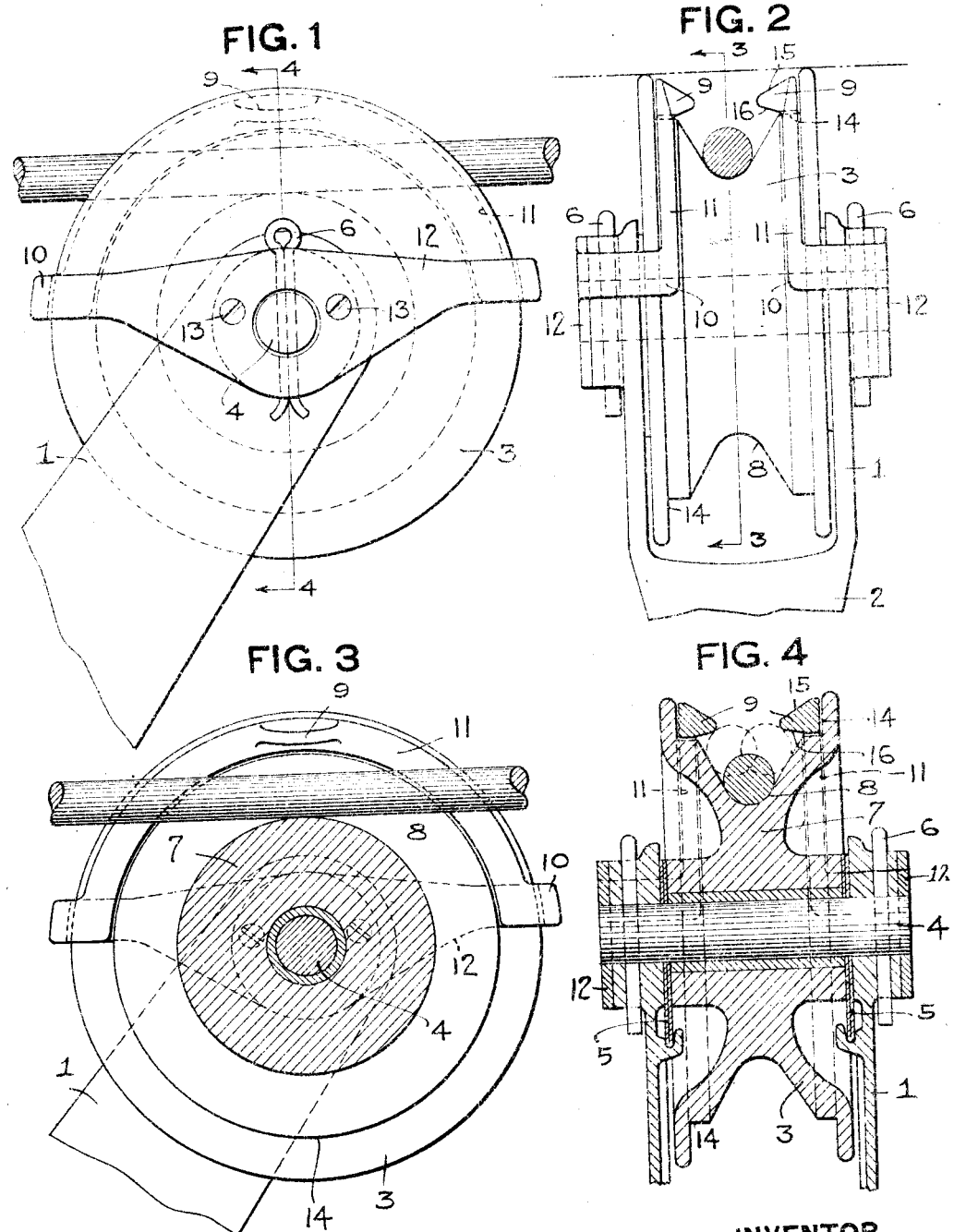

JOHN H. REESE, OF BUTLER, PENNSYLVANIA.

TROLLEY-WHEEL CONSTRUCTION.

1,194,543.

Specification of Letters Patent.

Patented Aug. 15, 1916.

Application filed March 30, 1915. Serial No. 18,167.

*To all whom it may concern:*

Be it known that I, JOHN H. REESE, a citizen of the United States, and resident of Butler, in the county of Butler and State of Pennsylvania, have invented a new and useful Improvement in Trolley-Wheel Construction; and I do hereby declare the following to be a full, clear, and exact description thereof.

My invention relates to improvements in trolley wheel constructions and is particularly concerned with improved means for retaining the trolley wire on the wheel when the trolley is traversing a curve or a wire somewhat out of alinement with the axis of the car. It is well understood that the trolley wire seldom leaves the trolley wheel in a direct line, but usually tends to slide off to one side.

It is the purpose of this invention, therefore, to prevent such lateral disengagement of the wire with the trolley wheel, while, at the same time, not interfering with the free rotation of the trolley wheel and the travel of the wire thereover.

A further object is to provide a construction such that the trolley wire may be readily engaged with the trolley-wheel.

A further object is to so arrange the wire retaining means as to permit the wheel to ride freely over a switch pan and, at the same time, not to widen the trolley wheel construction in order that it may travel over switch pans of the usual standard construction. In other words, the provision of the trolley wire retaining means does not widen the trolley wheel in any manner.

With these objects in view, the invention consists in a construction and arrangement of parts, a preferred embodiment of which is illustrated in the accompanying drawings in which—

Figure 1 is a side elevation of a trolley harp embodying my improvements; Fig. 2 is a front elevation thereof; Fig. 3 is a vertical sectional view taken at right angles to the axis of the trolley wheel; and Fig. 4 is a sectional view in the plane of the axis of the trolley wheel.

In the embodiment of the invention herein selected for illustration, 1 indicates the upper end of the trolley fork or harp mounted in the usual manner upon the trolley pole 2. Within the fork is rotatably mounted the trolley wheel 3 on a spindle 4, and interposed between the arms of the fork 1 and the hub of the trolley wheel is the usual contact spring 5 by which electrical connection between the fork and the trolley wheel is assured. The spindle 4 may be held within the fork of the trolley in any desired manner as, for instance, by cotter pins 6.

The trolley wheel may be of usual construction having the solid hub and web 7 and the trolley groove 8.

In order to retain the trolley wire in proper position in the groove of the trolley wheel under the varying conditions of operation, it is my purpose to provide a couple of lugs 9 projecting partially across the top of the trolley wheel in such position that they will prevent a lateral slipping off of the trolley wire and, at the same time, sufficient space is provided between them for the ready reception of the wire. These lugs may be formed integral with or mounted upon spiders or frames 10 respectively, which are here shown to consist of the arcuate portions 11 and cross or body pieces 12. The latter are apertured to fit over the ends of the wheel spindle 4 and may be secured in permanent positions upon the upper end of the fork my means of screws 13, Figs. 1 and 3. It will be noticed from Figs. 2 and 4 that the inner walls of the periphery of the trolley wheel groove are rabbeted or inset as at 14. This construction provides clearance for the arcuate portions 11 of the stop frames 10 and, at the same time, it permits of the proper positioning of the lugs 9 with reference to that portion of the groove of the trolley wheel which is traversed by the trolley wire. The upper faces 15 of the lugs 9 may be beveled to facilitate the ready slipping of the trolley wire in position on the trolley wheel, while the inner faces 16 of these lugs 9 are more or less abrupt, forming shoulders which prevent the wire from readily leaving the wheel.

It will be noticed that the stop frames holding the stop lugs 9 are, at the periphery of the trolley wheel, positioned entirely within the width of the wheel so that the trolley may be maintained at a width which will traverse readily switch pans of standard size and shape. It will also be noticed that these arcuate portions 11 of the stop frames 10 are entirely within the periphery of the trolley wheel so that they will not interfere with the travel of rolling of the wheel along the switch pans. Furthermore, it will be noticed that this device may be used with trolleys of standard construction by simply rabbeting the groove flanges of the wheel for the reception of the arcuate portions of the stop lug frames. This provides a simple and economical construction and one which may be employed with trolleys of standard construction.

While I have herein described a particular embodiment of the invention, it is to be understood that the same may be altered in details and arrangement of parts within the scope of the appended claims.

What I claim is:

1. The combination with a trolley harp, of a trolley wheel, a pair of stop shoulders or lugs carried by said harp located wholly within the periphery of said wheel to prevent accidental disengagement of the trolley wire therewith, and means for supporting said lugs without increasing the width of the trolley wheel.

2. The combination with a trolley harp, of a trolley wheel, a pair of trolley wire retaining lugs mounted wholly within the groove of the wheel and upon either side of the mouth of said groove to prevent accidental disengagement of the trolley wire with the wheel, and means mounted on the trolley fork for supporting said lugs.

3. The combination with a trolley harp, of a trolley wheel rotatably mounted therein, of a pair of stop frames mounted respectively on each side of the fork, said frames having arcuate portions extending wholly within the groove of the trolley wheel, said arcuate portions having lugs extending partially across the upper portion of the periphery of the groove of the trolley wheel to prevent accidental disengagement of the trolley wheel therewith.

4. The combination with a trolley harp, of a trolley wheel, of a pair of frames mounted respectively upon the ends of the trolley fork, each of said frames having an arcuate portion concentric with the axis of the wheel, the inner faces of the groove of said wheel being rabbeted or inset at opposite sides for the reception of said arcuate portions, each of said arcuate portions having a lug adapted to extend partially across the top of the trolley wheel groove to prevent accidental disengagement of the trolley wire therewith.

5. The combination with a trolley harp, of a trolley wheel, of a pair of frames mounted respectively upon the ends of the trolley fork, each of said frames having an arcuate portion concentric with the axis of the wheel, the inner faces of the groove of said wheel being rabbeted or inset at opposite sides for the reception of said arcuate portions, each of said arcuate portions having a lug adapted to extend partially across the top of the trolley wheel groove to prevent accidental disengagement of the trolley wire therewith, said arcuate portions of said frames and said lugs being entirely within the periphery of the trolley wheel to permit free rolling of the perimeter of the trolley wheels over switch pans and the like.

6. The combination with a trolley harp, of a trolley wheel, of a pair of frames mounted respectively upon the ends of the trolley fork, each of said frames having an arcuate portion concentric with the axis of the wheel, the inner faces of the groove of said wheel being rabbeted or inset at opposite sides for the reception of said arcuate portions, each of said arcuate portions having a lug adapted to extend partially across the top of the trolley wheel groove to prevent accidental disengagement of the trolley wire therewith, said frames and lugs above the axis of the trolley wheel being entirely within the width of said wheel to permit the wheel to traverse switch pans of standard construction.

In testimony whereof, I the said JOHN H. REESE, have hereunto set my hand.

JOHN H. REESE.

Witnesses:
A. J. GUMPPER,
THEODORE VOGELEY.